(12) United States Patent
Kümpers et al.

(10) Patent No.: US 8,114,793 B2
(45) Date of Patent: Feb. 14, 2012

(54) THREE-DIMENSIONAL TEXTILE COMPONENT STRUCTURE CONSISTING OF HIGH-TENSILE THREADS AND METHOD FOR PRODUCING SAID STRUCTURE

(75) Inventors: Franz-Jürgen Kümpers, Rheine (DE); Gregor Baumgart, Viersen (DE); Karl-Josef Brockmanns, Willich (DE)

(73) Assignee: SGL Kumpers GmbH & Co. KG, Rheine (DE)

( * ) Notice: Subject to any disclaimer, the term of this patent is extended or adjusted under 35 U.S.C. 154(b) by 187 days.

(21) Appl. No.: 12/223,832

(22) PCT Filed: Feb. 1, 2007

(86) PCT No.: PCT/EP2007/000850
§ 371 (c)(1),
(2), (4) Date: Mar. 26, 2010

(87) PCT Pub. No.: WO2007/090555
PCT Pub. Date: Aug. 16, 2007

(65) Prior Publication Data
US 2010/0291826 A1    Nov. 18, 2010

(30) Foreign Application Priority Data
Feb. 11, 2006   (DE) .......................... 10 2006 006 337

(51) Int. Cl.
*D04H 1/10* (2006.01)
*D04H 3/04* (2006.01)
*B65H 81/00* (2006.01)

(52) U.S. Cl. .......................... 442/312; 28/102; 156/173

(58) Field of Classification Search .................. 442/312; 28/102; 156/173
See application file for complete search history.

(56) References Cited

U.S. PATENT DOCUMENTS

| | | | |
|---|---|---|---|
| 3,592,884 A | 7/1971 | Williams | 264/45 |
| 4,320,160 A | 3/1982 | Nishimura et al. | 428/107 |
| 4,622,254 A * | 11/1986 | Nishimura et al. | 428/102 |
| 5,345,791 A | 9/1994 | Mathieu | 66/190 |

(Continued)

FOREIGN PATENT DOCUMENTS

DE    2032 423    1/1971

(Continued)

OTHER PUBLICATIONS

German Search Report.

*Primary Examiner* — Norca L Torres Velazquez
(74) *Attorney, Agent, or Firm* — K&L Gates LLP

(57) ABSTRACT

Three-dimensional textile component structure made of high-tensile yarns, subject to loads in defined directions in use, comprises wound layers one above the other of yarn sheets (3, 4) made of the high-tensile yarns and at least one yarn sheet (2) extending along the structure, made of the high-tensile yarns with the yarns of each yarn sheet (2) fixed in position by a textile structure (5) made of intersecting yarn systems. Such textile component structures are made by a method wherein yarn sheets (2-4) are laid as layers at different angles one after the other around a preshaped core (1) to produce independent layers of parallel high-tensile yarns, with at least one yarn layer (2) being fixed by a textile structure (5) made of intersecting yarn systems, while the remaining yarn sheets (3, 4) are wound.

20 Claims, 1 Drawing Sheet

U.S. PATENT DOCUMENTS 5,952,067 A 9/1999 Head .......................... 428/36.3
6,641,893 B1 * 11/2003 Suresh et al. ................ 428/105

FOREIGN PATENT DOCUMENTS

| | | |
|---|---|---|
| DE | 3528629 A1 | 2/1987 |
| DE | 3743485 A1 | 7/1989 |
| DE | 4124015 A1 | 1/1993 |
| DE | 10 2005 011 583 U1 | 1/2006 |
| EP | 0249372 A2 * | 12/1987 |
| EP | 0 442 092 A2 | 8/1991 |
| EP | 0 662 391 A2 | 7/1995 |
| FR | 2 864 972 | 7/2005 |
| GB | 1275705 | 5/1972 |
| GB | 2 178 820 A | 2/1987 |
| GB | 2 213 793 A | 8/1989 |
| JP | 57-139556 | 8/1957 |
| WO | WO 98/24616 | 6/1998 |
| WO | WO 99/33639 | 7/1999 |
| WO | WO 2005/071152 A1 | 8/2005 |

* cited by examiner

THREE-DIMENSIONAL TEXTILE COMPONENT STRUCTURE CONSISTING OF HIGH-TENSILE THREADS AND METHOD FOR PRODUCING SAID STRUCTURE

CROSS REFERENCE TO RELATED APPLICATIONS

This application claims the benefit of German patent application no. 10 2006 006 337.6, filed Feb. 11, 2006, herein incorporated by reference.

BACKGROUND OF THE INVENTION

The invention relates to a three-dimensional textile component structure made of high-tensile yarns, which is subject to loads in defined directions in the intended use, and a method of producing such a textile component structure.

Three-dimensional structures of components with a constant or even non-constant cross sectional course over the component length are increasingly produced using high-tensile textile yarns, for example carbon fibers. These high-tensile yarns are in a position to absorb substantial forces in their longitudinal direction without a lasting change of shape. These textile structures either form a reinforcement for these components or are themselves a substantial constituent of the component. In the latter case, the textile structures are stabilised with respect to their shape, in particular by elastic binding means, such as, for example, synthetic resin. Components of this type are used in the automotive or aviation sector and in the area of high-performance components for general machine and plant construction. The main advantage of these textile constructions, apart from the high strength values, is the low specific weight, which leads in particular to reduction in the inertia when they are used in moved, in particular accelerated components.

A frequent application consists in that shaped bodies, which substantially have the shape of the desired component, are used as the core for the textile component structure.

It is known in this context to form the textile component structure by braiding around the preshaped core. In this case, yarns can be incorporated into this braiding at an angle of 0° to +/−45°, in relation to the longitudinal axis of the component core, by means of strand carrier systems. With 90° loads in the component, a substantial use of material is required as the load direction differs from the yarn longitudinal direction of all the yarns of the braiding. Furthermore, the simultaneous processing of 45° yarns and 0° yarns causes problems in the braiding process due to sloughings and splicers, which are produced by the warping components of carbon filaments from the two yarn systems. If, for this reason, 0° carbon yarns are incorporated in 45° glass filaments, the structure is very unstable at 90° loads. Glass filaments in the longitudinal direction in turn lead to an instability in the longitudinal direction.

SUMMARY OF THE INVENTION

It is therefore the object of the invention to propose a three-dimensional textile component structure, which is better adapted to the intended load, as well as a corresponding method for producing this three-dimensional textile component structure.

This object is achieved by an improved three-dimensional textile component structure made of high-tensile yarns, which is subject to loads in defined directions in the intended use, and by providing an improved method for producing such three-dimensional textile component structures.

Further advantageous developments of the invention are described hereinafter.

The three-dimensional textile component structure according to the invention is comprised of wound layers arranged one above the other, of yarn sheets made of high-tensile yarns and at least one yarn sheet extending along the component structure, made of the high-tensile yarns, wherein the yarns of each longitudinally extending yarn sheet made of high tensile yarns are fixed with respect to their position by a textile structure made of intersecting yarn systems.

The supporting part of the three-dimensional textile component structure is formed by yarn sheets arranged layer-wise one above the other, which have no crossing or binding points to one another, which could lead to warping components and therefore damage to the fiber structure. These yarn sheets may be placed at virtually any angles. Like the angle of depositing the yarn sheets, the respective density of the yarn sheets can also be adapted to the load situation in the respective direction.

The textile structure made of intersecting yarn systems merely has the function of fixing the position of the yarns of the longitudinally extending yarn sheet, which even with changing cross sections of the component structure remain uniformly distributed on the periphery, in other words, have substantially the same spacings with respect to one another over the periphery. The layer structure according to the invention, at very high longitudinal forces, may also have a plurality of yarn sheets each fixed by a textile structure and extending longitudinally.

Owing to the adaptation of the angle of depositing of the respective yarn sheet with respect to the component axis, it is achieved that the force components during loading substantially extend in the longitudinal direction of the high-tensile yarns. This leads to an optimal substance utilisation of the high-tensile yarns. In turn, this leads to an economical use of fiber material being possible for a specific load situation. The depositing direction and number of yarns are accordingly appropriate to the load situation. The angle range of the depositing of the yarn sheets, in relation to the longitudinal axis of the component extends from 0° to virtually 90°. Thus all conceivable variants of load are covered. The invention thus allows a tailor-made construction for the required absorption of force.

Alternatively, the yarn sheets may be laid at a depositing angle which remains the same or changes. An angle which remains the same ensures a uniformly closed structure of the yarn layers, while with a changing angle, local load states can be taken into account in an optimal manner. The depositing structure accordingly has to be predetermined as a function of the known load structure when using the component.

The textile structure fixing the longitudinal yarns can be formed from yarns where no demands comparable to the high-tensile yarns are made of their tensile strength and which themselves do not suffer any damage at the crossing points. For this purpose, glass filaments are possible, for example, which are significantly more economical than yarns made of carbon fibers, for example.

The intersecting yarn systems of the textile structure, the yarns of which advantageously have a smaller cross section than the high-tensile yarns, in a development of the invention in favour of a drawn position of the high-tensile yarns, are more highly shaped, so the textures being produced by the intersection are virtually completely taken up by the intersecting yarns. This ensures a drawn position of the load-absorbing yarns in the direction of the force loading. The longitudinal yarns are advantageously incorporated as so-called standing ends into the textile structure.

The textile structure may alternatively be configured as a braiding or knitted fabric. The component structure is three-dimensionally stabilised by a resin, for example.

In terms of the method, the yarn layers of yarn sheets are arranged one after the other at different angles around a preshaped core, in other words, the laying mechanisms and component are moved relative to one another, the laying mechanisms being arranged one behind the other. As a result, the layers are built up at different angles one after the other around the component core. The yarn sheet extending along the component structure is fixed with respect to its position by means of a textile structure of intersecting yarn systems. With regard to the sequence of the arrangement of the individual yarn layers, there is no imperative specification, even if the formation of the longitudinally arranged yarn sheet as the innermost layer is advantageous. Finally, a further layer of longitudinally extending yarns may be formed, however.

The different laying angles are, on the one hand, determined by the peripheral speed of the laying means guiding the yarn sheets and, on the other hand, by the relative speed between the component and laying means. If, for example, with the same relative speed between the laying means and component, the peripheral speed of the laying means increases, the angle with respect to the longitudinal axis of the component or the core of the component is also increased. In the case of a very high peripheral speed of the laying means for the yarn sheets and a low feed speed of the component, a depositing angle of virtually 90° can be achieved. If the laying means do not take part in a rotation, so-called 0° yarns are deposited, which extend coaxially to the component axis. These yarns are then incorporated as so-called standing ends into the textile structure. Depending on the direction of rotation of the laying means, positive or negative depositing angles are achieved in relation to the longitudinal axis.

By changing the respective speeds, the laying angles can be adapted to local requirements.

The textile structure of intersecting yarn systems for fixing the longitudinally oriented yarn layers is virtually without significance for the later use properties of the component structure. It should therefore be emphasised that the use of material is selected to be as low as possible or necessary and the method ensures high productivity. In other words, the structure can also be designed to be relatively open, so the efficiency of this process is increased. It is in particular advantageous that the intersecting yarns be supplied at a relatively low yarn tension in order to virtually completely take up the textures being produced from the intersecting by means of these yarns, while the longitudinal yarns absorbing the force are embedded in the textile structure, virtually fully drawn.

As all the laying processes and the fixing process of the longitudinal yarns can proceed simultaneously, in other words in stages during a run of the component structure, high productivity is ensured.

Owing to the subsequent binding with a resin, the structure is also three-dimensionally fixed in such a way that it is possible to then dispose of the core which is still necessary when producing the textile component structure. A hollow body is produced which has both good elasticity properties as well as excellent support properties. The low weight thereof also ensures excellent properties in use.

The disposal of the core may take place by the dissolution of the core material (soluble sands) or shrinkage (for example inflatable structure).

BRIEF DESCRIPTION OF THE DRAWING

The invention will be further described below with the aid of an embodiment. The single FIGURE shows the textile component structure including the core in the production process.

DETAILED DESCRIPTION OF THE PREFERRED EMBODIMENTS

Figure 1:
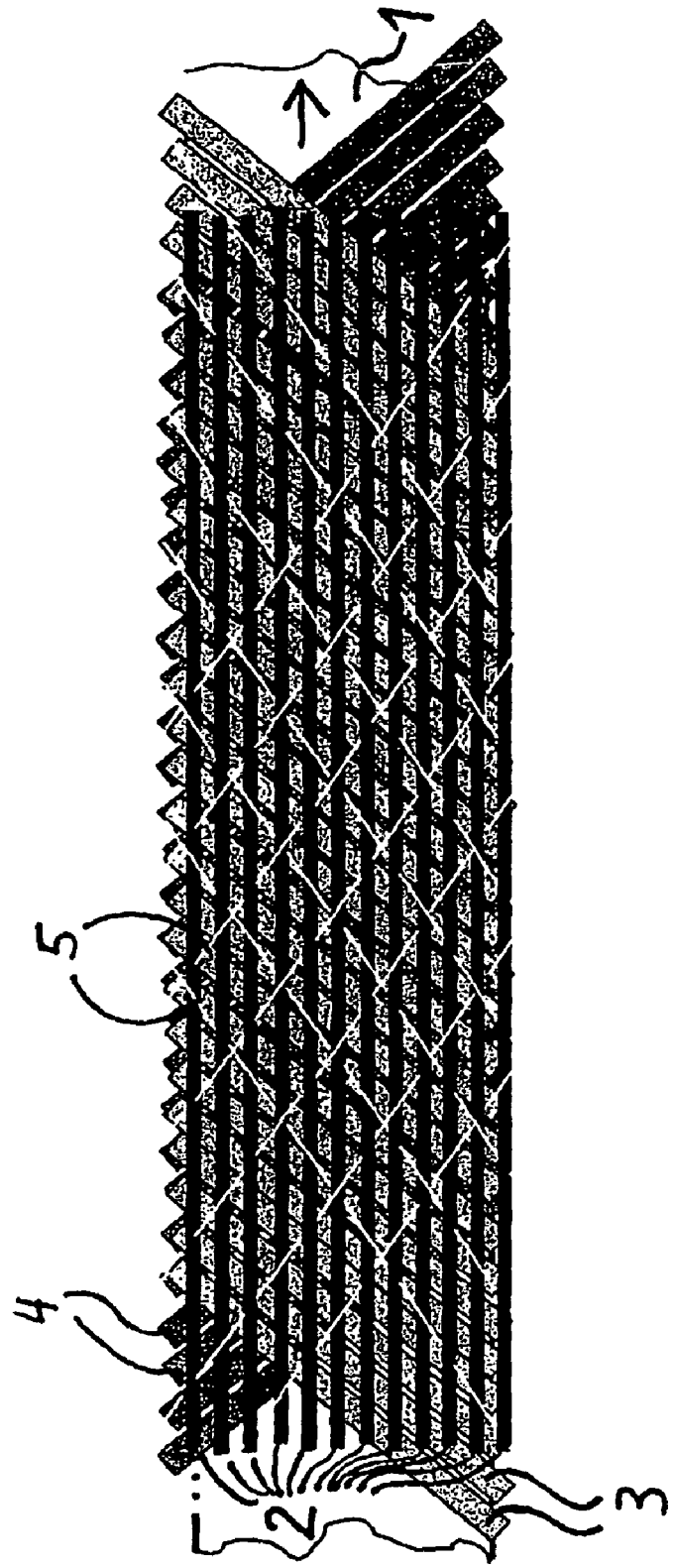

The core 1 is, for example, formed as a bumper of a car. This core 1 is pushed in the arrow direction by the corresponding supply elements for the yarn sheets 2 to 4, and the braiding tools to produce a braiding 5.

Firstly, a yarn sheet 2 is supplied, the supply elements of which are arranged stationarily, so that this yarn sheet lies parallel with respect to the longitudinal axis of the core 1. This yarn sheet 2 is incorporated by means of a braiding 5 as a sheet of so-called standing ends and fixed with respect to its position such that even in the event of shape and cross sectional changes of the core, the yarns of the yarn sheet 2 have the same spacings with respect to one another over the periphery of the core 1.

The yarn sheet 3 is placed at a relatively high peripheral speed around the core 1 in the clockwise direction, so a depositing angle of about 70° is produced. The yarn sheet 4 is placed at a slightly lower peripheral speed around a core 1 in the opposite direction. This produces a depositing angle of −60°.

As an alternative to the movement of the core 1, the corresponding placing and braiding members could also be moved along the component. This depends, in each case, on the corresponding relative speed.

Only one yarn of the respective yarn sheet 3, 4 is shown, in each case, in the drawing for simplification. In practice, as expressed by the term "yarn sheet" a sheet of yarns located parallel to one another is placed. In this case, the width of the yarn sheet should be adjusted such that, during winding, the layers come to rest next to one another in such a way that the yarn spacing, which remains constant, is not only ensured within the sheet, but also between the helically extending layers.

What is claimed is:

1. A three-dimensional textile component structure adapted to absorb loads in defined directions during use, the textile component structure being comprised of high-tensile yarns formed in surrounding relation about a longitudinally extending core area, characterized by a plurality of yarn sheets (3, 4) comprised of parallel high-tensile yarns wound about the core area (1) in layers with one yarn sheet above the other and with the yarns in the yarn sheets (3, 4) oriented at differing angles relative to the longitudinal extent of the core area (1), and at least one other yarn sheet (2) comprised of parallel high-tensile yarns surrounding the core area and extending along the longitudinal extent of the core area (1), the yarns of the yarn sheet (2) being fixed relative to each other in said longitudinally extending disposition by a textile structure (5) made of an intersecting yarn system.

2. Three-dimensional textile component structure according to claim 1, characterised in that the wound angles of the yarn sheets (3, 4) are matched to defined main load directions in such a way that force components acting during loading substantially extend in the longitudinal direction of the core area.

3. Three-dimensional textile component structure according to claim 1, characterised in that the number of high-tensile yarns within the respective yarn sheets is different and matched to the level of the loads provided.

4. Three-dimensional textile component structure according to claim 1, characterised in that the yarn sheets (3, 4) are arranged in an angle range of 0° to virtually 90°.

5. Three-dimensional textile component structure according to claim 4, characterised in that each yarn sheet is wound at an angle remaining constant.

6. Three-dimensional textile component structure according to claim 4, characterised in that in at least one yarn sheet (3, 4), the winding angle varies as a function of local load states of the component during its intended use.

7. Three-dimensional textile component structure according to claim 1, characterised in that the textile structure (5), which fixes the longitudinally extending yarn sheet (2), is formed from yarns which are of lower value and have lower tensile strength than the yarns of the sheets (2-4).

8. Three-dimensional textile component structure according to claim 4, characterised in that the yarns of the fixing textile structure (5) have a smaller cross section than the high-tensile yarns of the yarn sheets (2-4) and do not impair a substantially drawn form of the high-tensile yarns.

9. Three-dimensional textile component structure according to claim 1, characterised in that the fixing textile structure (5) is produced by braiding.

10. Three-dimensional textile component structure according to claim 1, characterised in that the fixing textile structure (5) is a knitted structure.

11. Three-dimensional textile component structure according to claim 9, characterised in that the yarns of the other yarn sheet (2) to be fixed are incorporated into the textile structure (5) as standing ends.

12. Three-dimensional textile component structure according to claim 1, characterised in that the yarn sheets are stabilised three-dimensionally by means of synthetic resin.

13. A method for producing a three-dimensional textile component structure adapted to absorb loads in defined directions during use, comprised by forming high-tensile yarns in surrounding relation about a longitudinally extending core area, characterised by winding a plurality of yarn sheets (3, 4) of parallel high-tensile yarns about the core area in layers with one yarn sheet above the other and with the yarns in the yarn sheets (3, 4) oriented at different angles relative to the longitudinal extent of the core area (1), forming at least one other yarn sheet (2) of parallel high-tensile yarns in surrounding relation to the core area with the yarns thereof extending along the longitudinal extent of the core area (1), and fixing the yarns of the other yarn sheet (2) relative to each other in said longitudinally extending disposition by a textile structure (5) made of an intersecting yarn system while the yarn sheets (3, 4) are wound.

14. Method according to claim 13, characterised in that the different winding angles of the yarn sheets (3, 4) are adjusted by adjusting a peripheral speed of a winding means guiding the yarn sheets (3, 4) in relation to a speed of positional change of a component core, which defines the core area, relative to the winding means.

15. Method according to claim 14, characterised in that intersecting yarns of the textile structure (5) are supplied at such a low yarn tension that they do not noticeably deflect the yarns of the yarn sheet (2) made of high-value material, which they fix, from their longitudinal direction.

16. Method according to claim 13, characterised in that the textile structure (5) fixes the longitudinally extending yarn layer (2) by braiding the intersecting yarn system.

17. Method according to claim 13, characterised in that the textile structure (5) fixes the longitudinally extending yarn layer (2) by knitting the intersecting yarn system.

18. Method according to claim 13, characterised in that the three-dimensional textile component structure is bound after production thereof by a synthetic resin and thereby fixed with respect to its shape.

19. Method according to claim 18, characterised in that the core area is defined by a pre-shaped core (1) and, after the fixing of the shape of the textile component structure, the preshaped core (1) is disposed of.

20. Method according to claim 19, characterised in that the core (1) is dissolved or shrunk and removed in this state from within the component structure.

* * * * *